United States Patent [19]
McFarlane

[11] Patent Number: 6,024,305
[45] Date of Patent: Feb. 15, 2000

[54] DISCHARGE APPARATUS FOR DISCHARGING MATERIALS

[75] Inventor: Claude L. McFarlane, Madison, Wis.

[73] Assignee: Knight Manufacturing Corp., Brodhead, Wis.

[21] Appl. No.: 08/871,425

[22] Filed: Jun. 9, 1997

[51] Int. Cl.$^7$ .................................................. A01C 17/00
[52] U.S. Cl. ...................... 239/684; 239/689; 239/658; 239/69
[58] Field of Search ................... 239/63, 67, 69, 239/155, 658, 665, 668, 676, 677, 683, 684, 687, 689; 364/145, 420

[56] References Cited

U.S. PATENT DOCUMENTS

| | | | |
|---|---|---|---|
| 3,241,841 | 3/1966 | Kucera | 239/658 |
| 4,373,668 | 2/1983 | Forbes et al. | 239/684 X |
| 4,630,773 | 12/1986 | Ortlip | 239/155 X |
| 5,186,396 | 2/1993 | Wise et al. | 239/684 X |
| 5,318,226 | 6/1994 | Kime et al. | 239/687 X |
| 5,653,389 | 8/1997 | Henderson et al. | 239/69 |

FOREIGN PATENT DOCUMENTS 854305   8/1981   U.S.S.R. ................. 239/689

Primary Examiner—Andres Kashnikow
Assistant Examiner—Steven J. Ganey
Attorney, Agent, or Firm—David J. Archer

[57] ABSTRACT

A discharge apparatus for discharging materials from a container onto a field, the apparatus comprising a power discharge device disposed adjacent to a discharge outlet defined by the container, the arrangement being such that when the apparatus is being used to spread the materials onto the field, the materials move from the container through the outlet towards the discharge device. A motor is drivingly connected to the discharge device for rotating the discharge device. A power sensor senses the power used by the motor and a control controls the rate at which the materials are spread. A data storage device associated with the power sensor and the control regulates the control. The arrangement is such that the data storage device dependent on the power sensor regulates the control for controlling the rate at which the materials are discharged so that when the container is moved across the field, the materials are discharged onto the field at a varying rate in order to optimize usage of the materials.

17 Claims, 2 Drawing Sheets

DISCHARGE APPARATUS FOR DISCHARGING MATERIALS

BACKGROUND OF THE INVENTION

1. Field of the Invention

The present invention relates to a discharge apparatus for discharging materials from a container onto an open area such as a field.

More specifically, the present invention relates to a discharge apparatus for discharging materials from a manure spreader container onto any open area such as a field.

2. Information Disclosure Statement

Normally, when manure or other fertilizers are to be spread over a field to be cultivated, the manure is evenly spread over the entire surface of the field.

However, each field has inherent characteristics which make it advantageous to apply varying quantities of the fertilizer to different parts of the field.

For example, certain parts of the field such as a valley portion may have a relatively thick soil coverage whereas an elevated portion of the same field may have had much of the soil eroded therefrom thus requiring a relative increase in soil nutrient replacement.

In view of the requirements for a variable spread of manure over the area of the field, spreader programs have been developed which optimize the amount of fertilizer required for each portion of the field.

The aforementioned programs are sometimes developed by combining the results of individual soil sample analyses taken from the various portions of the field. Accordingly, a map of the field is generated together with a set spread pattern so that the amount of fertilizer is adjusted manually to correspond with the previously determined spread requirements.

Therefore, by utilizing the spreader program, a farmer is able to raise crops of uniform quality throughout the entire field under cultivation.

In recent years, satellites have enabled the accurate determination of the actual location of a spot on the surface of the earth within a few feet and to provide not only a read out of the longitude and latitude but also the elevation of such a spot. Such a means for ascertaining a location is known in the art as a "global positioning system" or GPS.

The present invention combines the aforementioned GPS technology with a land survey such that the actual location of a spreader spreading material in an open area such as a field can be continuously monitored. Such a system in combination with a soil requirement survey enables the generation of a program for regulating the amount of materials spread at any location on the open area such as a field.

Accordingly, for a particular location, the soil requirement is determined from the survey "map" so that the program generates a signal which may be used to regulate the amount of materials spread to optimize crop cultivation.

More specifically, such regulation may include one or more of the following arrangements:

1) Control of the power supplied from the motor driving and discharge means.
2) Adjusting the opening of a door between the manure container and the discharge apparatus.
3) Regulating the land speed of the apparatus.
4) Altering the rotational speed of a discharge auger disposed in the materials container.

Therefore, it is a primary objective of the present invention to provide a discharge apparatus that overcomes the problems associated with the prior art proposals and which makes a considerable contribution to the art of spreading materials and the like on a field.

Another object of the present invention is the provision of a discharge apparatus that includes a variable delivery discharge controlled by a program that optimizes the materials spread pattern.

Other objects and advantages of the present invention will be readily apparent to those skilled in the art by a careful consideration of the detailed description contained hereinafter taken in conjunction with the annexed drawings.

SUMMARY OF THE INVENTION

The present invention relates to a discharge apparatus and method for discharging materials onto a field or open area to be cultivated.

More particularly, the present invention concerns a discharge apparatus for discharging materials from a container onto a field. The apparatus includes a rotary discharge means disposed adjacent to a discharge outlet defined by the container. The arrangement is such that when the apparatus is being used to spread the materials onto the field, the materials move from the container through the outlet towards the discharge means.

A power means is drivingly connected to the discharge means for rotating the discharge means.

A power sensor for sensing the power supplied by the power means.

A control is responsive to the power sensing means for variably controlling a rate at which the materials are discharged from the discharge means.

A is associated with the power sensor and the control for regulating the control. The arrangement is such that the data storage device dependent on the power sensor regulates the control for controlling the rate at which the materials are discharged so that when the container is moved across the field, the materials are discharged onto the field at a varying rate in order to optimize usage of the materials.

In a more specific embodiment of the present invention, the rotary discharge means includes a housing defining an inlet port and a discharge port, such that in use of the apparatus, the materials flow from the inlet port towards the discharge port.

A rotatable axle is disposed within the housing and extends across the flow of materials as the materials flow from the inlet port towards the discharge port, the axle being drivingly connected to the power means.

A hammer means is secured to the axle such that when the axle rotates, the hammer means rotates within the housing for imparting kinetic energy to the materials for spreading the materials onto the field.

The housing is of generally cylindrical configuration, the inlet port being connected to the outlet of the container.

The rotatable axle is bearingly supported by the housing, the axle being disposed horizontally or vertically.

The hammer means includes a portion rigidly secured to the axle and a hammer portion pivotally secured to the portion so that in use of the apparatus, when the axle is rotating, the hammer portion extends generally radially away from the axle towards the housing such that the rotating hammer portion imparts the kinetic energy to the materials.

In a preferred embodiment of the present invention, the power means is a hydraulic motor.

In an alternative embodiment of the present invention, the power means is an electric motor or an internal combustion engine.

The power sensor senses the torque and the rate of revolution of the discharge means.

The control includes one or more of the following arrangements:

1) Control of the power supplied by the power means.
2) Adjusting the opening of a door between the manure container and the discharge apparatus.
3) Regulating the land speed of the apparatus.
4) Altering the rotational speed of a discharge mechanism such as an auger disposed within the container.

The data storage device includes means for storing data corresponding to information received from a survey of the field.

The survey includes a combined global positioning system and soil analysis survey.

Also, the data storage device is associated with the power sensor and the control for regulating the control. The arrangement is such that the data storage device dependent on the power sensor regulates the control for controlling the rate at which the materials are discharged so that when the container is moved across the field, the materials are discharged onto the field at a varying rate in order to optimize usage of the materials.

Many modifications and variations of the present invention will be readily apparent to those skilled in the art by a consideration of the detailed description of a preferred embodiment of the present invention. However, such modifications and variations fall within the spirit and scope of the present invention as defined by the appended claims.

BRIEF DESCRIPTION OF THE DRAWINGS

Similar reference characters refer to similar parts throughout the various embodiments of the present invention.

DETAILED DESCRIPTION OF EMBODIMENTS OF THE PRESENT INVENTION

Figure 1:
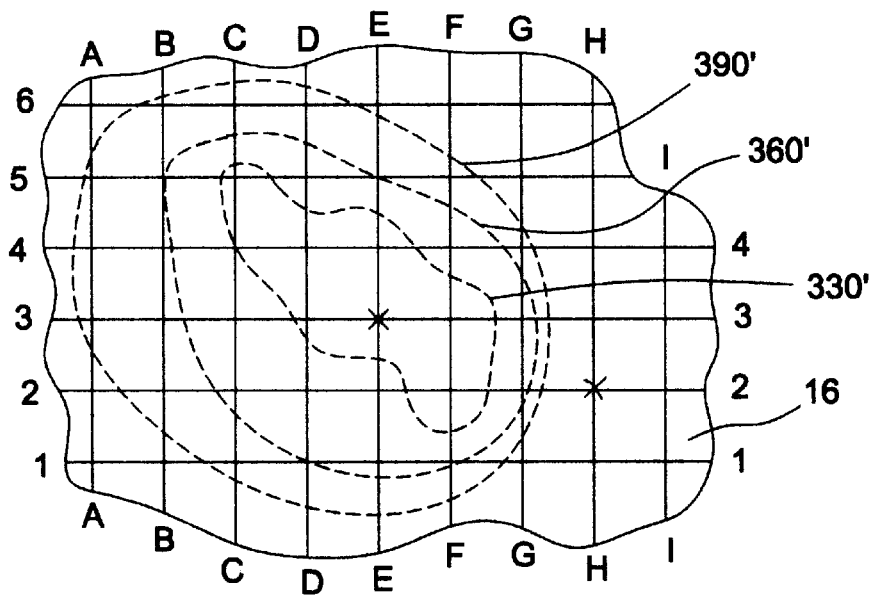
FIG. 1 is a diagrammatic plan view of a survey map of a field to be cultivated.

FIG. 1 is a diagrammatic plan view of a survey map of a field to be cultivated. The map shows a field 16 divided into portions having coordinates A-I, 1-6. The map also shows the elevation of the field. For example, coordinate E,3 is low lying and may not require as much fertilizer as portion H,2 which is at a relatively high elevation of 390 feet.

Figure 2:
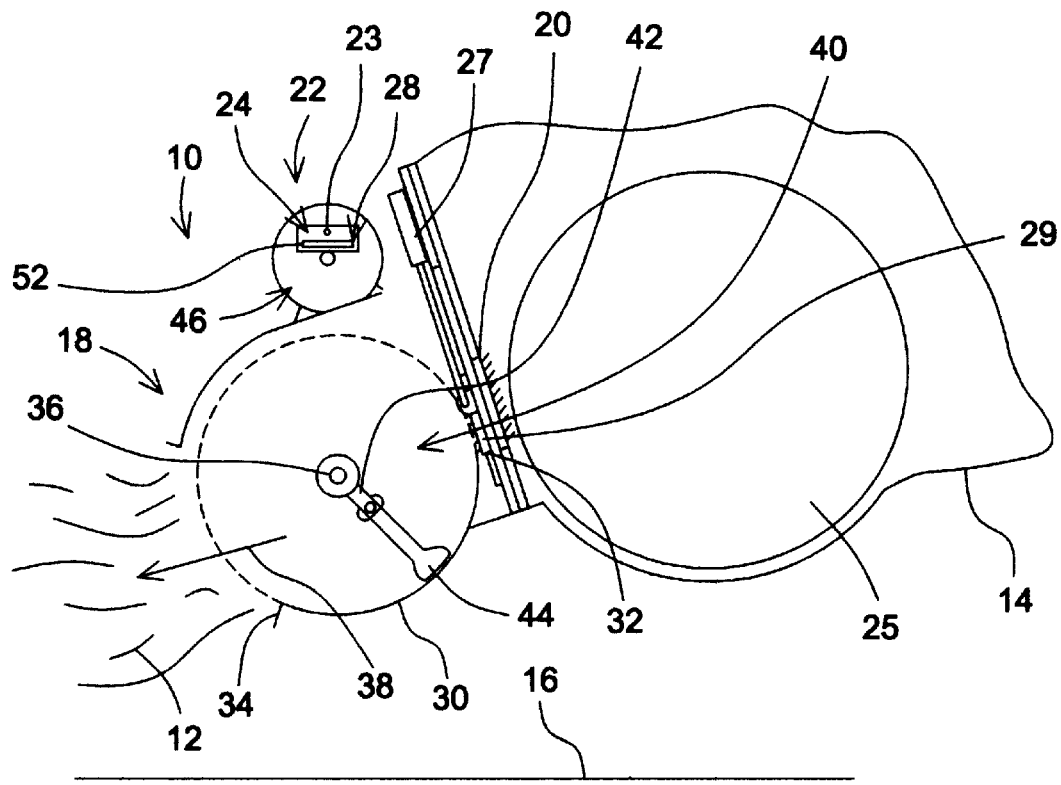
FIG. 2 is a sectional view of a discharge apparatus according to the present invention.

FIG. 2 is a sectional view of a discharge apparatus generally designated 10 according to the present invention.

FIG. 2 shows the discharge apparatus 10 for discharging materials 12 from a container 14 onto a field 16. The apparatus 10 includes a rotary discharge means generally designated 18 disposed adjacent to a discharge outlet 20 defined by the container 14. The arrangement is such that when the apparatus 10 is being used to spread the materials 12 onto the field 16, the materials 12 move from the container 14 through the outlet 20 towards the discharge means 18.

A power means generally designated 22 is drivingly connected to the discharge means 18 for rotating the discharge means 18.

A power sensor 23 senses the torque and the revolutions per minute of the discharge means 18.

A control generally designated 24 includes one or more of the following arrangements:

1) Control of the power supplied by the power means 22.
2) Adjusting the opening of a door to be described hereinafter disposed between the manure container 14 and the discharge apparatus 10.
3) Regulating the land speed of the apparatus 10.
4) Altering the rotational speed of a discharge auger 25 disposed in the container 10.

A data storage device generally designated 28 is associated with the power sensor 23 and the control 24 for regulating the control 24. The arrangement is such that the data storage device 28 dependent on the power sensor 23 regulates the control 24 for controlling the rate at which the materials 12 are discharged so that when the container 14 is moved across the field, the materials 12 are discharged onto the field at a varying rate in order to optimize usage of the materials.

Rotary Discharge Means

In a more specific embodiment of the present invention, the rotary discharge means 18 includes a housing 30 defining an inlet port 32 and a discharge port 34, such that in use of the apparatus 10, the materials 12 flow from the inlet port 32 towards the discharge port 34.

A rotatable axle 36 is disposed within the housing 30 and extends across a flow as indicated by the arrow 38 of materials 12 from the inlet port 32 towards the discharge port 34, the axle 36 being drivingly connected to the power means 22.

A hammer means generally designated 40 is secured to the axle 36 such that when the axle 36 rotates, the hammer means 40 rotates within the housing 30 for imparting kinetic energy to the materials 12 for spreading the materials 12 onto the open area such as a field 16.

The housing 30 is of generally cylindrical configuration, the inlet port 32 being connected to the outlet 20 of the container 14.

The rotatable axle 36 is bearingly supported by the housing 30, the axle 36 being disposed horizontally.

The hammer means 40 includes a portion 42 rigidly secured to the axle 36 and a hammer portion 44 pivotally secured to the portion 42 so that in use of the apparatus 10, when the axle 36 is rotating, the hammer portion 44 extends generally radially away from the axle 36 towards the housing 30 such that the rotating hammer portion 44 imparts the kinetic energy to the materials 12.

Figure 3:
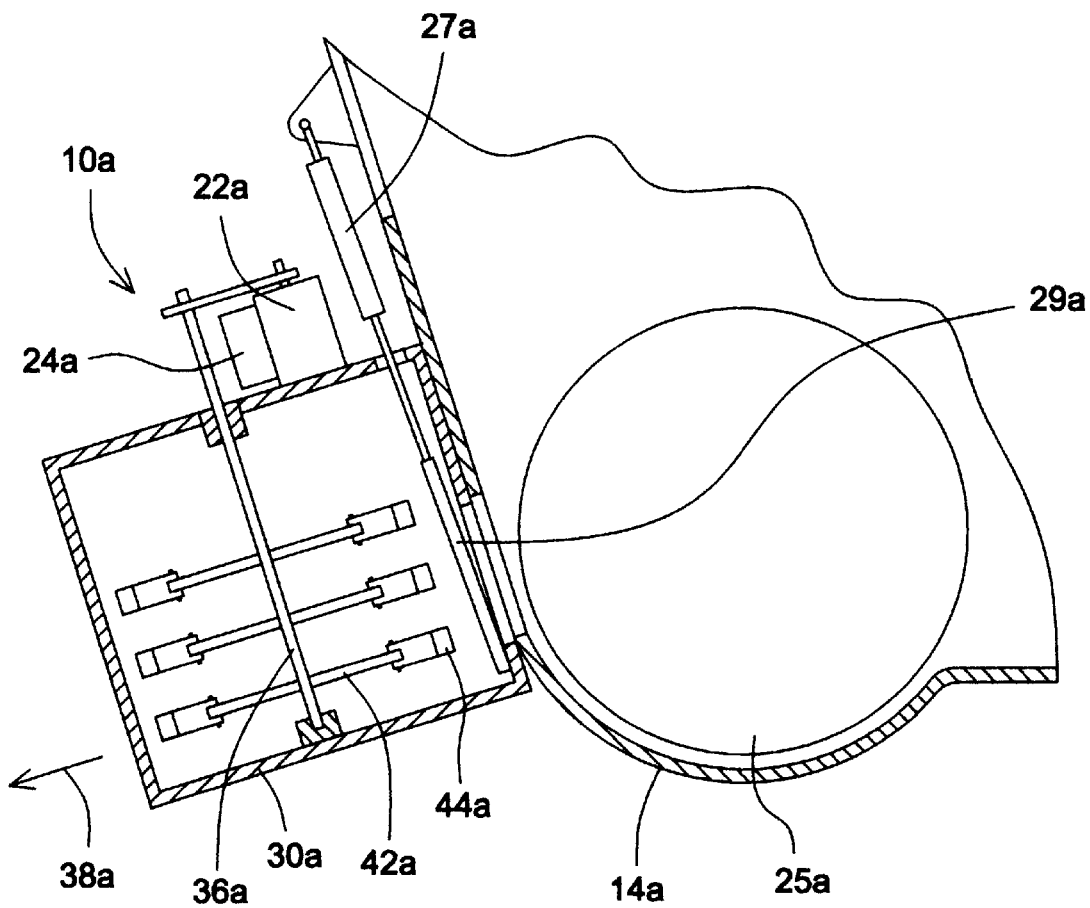
FIG. 3 is a sectional view of a discharge apparatus according to another embodiment of the present invention.

In an alternative embodiment shown in FIG. 3, the axle 36a is disposed vertically and there may be provided a further cooperating vertical axle with corresponding hammer portions.

Power Means

In a preferred embodiment of the present invention, the power means 22 is a hydraulic motor 46.

In an alternative embodiment of the present invention, the power means 22 is an electric motor or an internal combustion motor.

Sensing Means

The power sensor 23 is operatively connected to the power means 22 for sensing the power used by the power means 22.

Control Means

The control 24 is responsive to the power sensor 23 for variably controlling a rate at which the materials 12 are discharged from the discharge means 10.

More particularly, the control 24 includes one or more of the following:

A power control for controlling power supplied to the power means 22 from a source of power not shown.

A speed control for controlling a rotational speed of the discharge auger 25 disposed within the container 14.

A ground speed control for controlling a ground speed of the apparatus 10.

Means for controlling a moving means 27 such as a hydraulic cylinder for adjusting the disposition of a door 29 disposed between the outlet 20 and the inlet port 32.

Programmable Means

The data storage device 28 in a preferred embodiment of the present invention is a data storage device for storing data corresponding to information received from a survey of the field 16. It will also be understood by those skilled in the art that manual means could be used as an alternative arrangement instead of the data storage device.

The survey includes a combined global positioning system and soil analysis survey.

Such survey may include any or all of the following information: Topography, moisture, soil type, crop yield, fertility.

Also, it will be understood by those skilled in the art that a LORAN type of system or an ACCUTRAK system is included in the generic term GPS.

The data storage device 28 is associated with the power sensor 23 and the control 24 for regulating the control 24. The arrangement is such that the data storage device 28 dependent on the power sensor 23 regulates the control 24 for controlling the rate at which the materials 12 are discharged so that when the container 14 is moved across the field, the materials 12 are discharged onto the field at a varying rate or area in order to optimize effectiveness of the materials.

The present invention enables an operator to automatically or manually vary the amount of fertilizer spread over different parts of a field to optimize crop cultivation while minimizing cost.

What is claimed is:

1. A discharge apparatus for discharging materials from a container onto an open area such as a field, the apparatus comprising:

a power discharge means disposed adjacent to a discharge outlet defined by the container, the arrangement being such that when the apparatus is being used to spread the materials onto the open area such as a field, the materials move from the container through said outlet towards said discharge means;

power means drivingly connected to said discharge means for rotating said discharge means;

a power sensor for sensing the torque and a rate of rotation of the discharge means for determining the power used by said discharge means; and a control responsive to said power sensor for variably controlling a rate at which the materials are discharged from said discharge means.

2. A discharge apparatus for discharging materials from a container onto an open area such as a field, the apparatus comprising:

a power discharge means disposed adjacent to a discharge outlet defined by the container, the arrangement being such that when the apparatus is being used to spread the materials onto the open area such as a field, the materials move from the container through said outlet towards said discharge means;

power means drivingly connected to said discharge means for rotating said discharge means;

a power sensor for sensing the power used by said discharge means;

a control responsive to said power sensor for variably controlling a rate at which the materials are discharged from said discharge means;

said discharge means including:

a housing defining an inlet port and a discharge port, such that in use of the apparatus, the materials flow from said inlet port towards said discharge port;

a rotatable axle disposed within said housing and extending across the discharging materials, said axle being drivingly connected to said power means; and hammer means secured to said axle such that when said axle rotates, said hammer means rotate within said housing for imparting kinetic energy to the materials for spreading the materials onto the field.

3. A discharge apparatus as set forth in claim 2 further including:

a data storage device associated with said power sensor and said control for regulating said control, the arrangement being such that said data storage device dependent on said power sensor regulates said control for controlling the rate at which the materials are discharged so that when the container is moved across the field, the materials are discharged onto the field at a varying rate in order to control usage of the materials.

4. A discharge apparatus as set forth in claim 3 wherein said data storage device is a data storing device for storing data corresponding to information received from a survey of the field.

5. A discharge apparatus as set forth in claim 4, wherein said survey includes:

a combined global positioning system and soil analysis.

6. A discharge apparatus as set forth in claim 2 wherein said housing is of generally cylindrical configuration, said inlet port being connected to said outlet of the container.

7. A discharge apparatus as set forth in claim 2 wherein said rotatable axle is bearingly supported by said housing, said axle being disposed horizontally.

8. A discharge apparatus as set forth in claim 2 wherein said rotatable axle is bearingly supported by said housing, said axle being disposed vertically.

9. A discharge apparatus as set forth in claim 2 wherein said hammer means includes:

a portion rigidly secured to said axle;

a hammer portion pivotally secured to said portion so that in use of the apparatus, when said axle is rotating, said hammer portion extends generally radially away from said axle towards said housing such that said rotating hammer portion imparts said kinetic energy to the materials.

10. A discharge apparatus as set forth in claim 2 wherein said discharge means further includes:

a door movably disposed adjacent to said discharge outlet and said inlet port;

moving means connected to said door for controllably moving said door between an open and a closed disposition thereof.

11. A discharge apparatus as set forth in claim 10 wherein said control includes:

means for controlling said moving means for adjusting said disposition of said door.

12. A discharge apparatus as set forth in claim 2 wherein said power means is a hydraulic motor.

13. A discharge apparatus as set forth in claim 2 wherein said power means is an electric motor.

14. A discharge apparatus as set forth in claim 2 wherein said power means is an internal combustion motor.

15. A discharge apparatus as set forth in claim 2 wherein said control includes:
   a power control for controlling power supplied by said power means.

16. A discharge apparatus as set forth in claim 2 wherein said control includes:
   a speed control for controlling the speed of said discharge means.

17. A discharge apparatus as set forth in claim 2 wherein said control includes:
   a ground speed control for controlling a ground speed of the apparatus.

* * * * *

UNITED STATES PATENT AND TRADEMARK OFFICE
CERTIFICATE OF CORRECTION

PATENT NO : 6,024,305
DATED : February 15, 2000
INVENTOR(S) : Claude L. McFarlane.

It is certified that error appears in the above-identified patent and that said Letters Patent is hereby corrected as shown below:

At column 2, line 34, insert --data storage device-- before "is associated with"

Signed and Sealed this

Ninth Day of January, 2001

Attest:

Q. TODD DICKINSON

*Attesting Officer*   *Commissioner of Patents and Trademarks*